(12) United States Patent
Hagendorf

(10) Patent No.: US 8,917,635 B2
(45) Date of Patent: *Dec. 23, 2014

(54) METHOD FOR DYNAMICALLY OPTIMIZING BANDWIDTH ALLOCATION IN VARIABLE BITRATE (MULTI-RATE) CONFERENCES

(75) Inventor: Pierre Hagendorf, Raanana (IL)

(73) Assignee: Avaya, Inc., Basking Ridge, NJ (US)

( * ) Notice: Subject to any disclaimer, the term of this patent is extended or adjusted under 35 U.S.C. 154(b) by 1286 days.

This patent is subject to a terminal disclaimer.

(21) Appl. No.: 12/351,928

(22) Filed: Jan. 12, 2009

(65) Prior Publication Data

US 2009/0153645 A1 Jun. 18, 2009

Related U.S. Application Data

(63) Continuation of application No. 10/949,922, filed on Sep. 24, 2004, now Pat. No. 7,492,731.

(30) Foreign Application Priority Data

Oct. 2, 2003 (IL) .......................................... 158276

(51) Int. Cl.
*H04L 12/16* (2006.01)
*H04L 12/801* (2013.01)
*H04L 12/927* (2013.01)
*H04L 12/18* (2006.01)
*H04N 21/2385* (2011.01)
*H04L 12/825* (2013.01)
*H04N 7/15* (2006.01)
*H04L 12/923* (2013.01)
*H04L 12/919* (2013.01)
*H04L 12/54* (2013.01)

(52) U.S. Cl.
CPC ................ *H04N 7/152* (2013.01); *H04L 47/15* (2013.01); *H04L 47/806* (2013.01); *H04L 12/1827* (2013.01); *H04N 21/2385* (2013.01); *H04L 47/25* (2013.01); *H04L 47/762* (2013.01); *H04L 47/765* (2013.01); *H04L 47/801* (2013.01); *H04L 47/10* (2013.01); *H04L 12/5695* (2013.01)
USPC ..................................... 370/262; 379/202.01

(58) Field of Classification Search
CPC .......... H04N 7/15; H04N 7/152; H04L 65/80; H04L 65/403; H04L 12/1818; H04L 12/1813; H04L 45/304; H04L 43/0876; H04M 3/2227
USPC .................... 370/260–269; 348/14.01–14.16; 455/416; 379/93.21, 158, 202.01, 379/205.01, 207.01
See application file for complete search history.

(56) References Cited

U.S. PATENT DOCUMENTS 5,596,362 A * 1/1997 Zhou .......................... 348/14.01
5,729,484 A * 3/1998 Mack et al. .................... 708/400

(Continued)

*Primary Examiner* — Akelaw Teshale

(57) ABSTRACT

Method for dynamically optimizing bandwidth allocation in a variable bitrate conference environment. Conference means with two or more outputs are provided, where each one can output data at different rates, in order to support two or more endpoints which may have different media rates. Two or more endpoints are connected to these conference means for participating in the conference. Whenever more than one video rate is used by participants during the conference, each set of output rates is selected from all possible combinations of output rates in the conference means, wherein the lowest output rate in each selected set is the entry rate of the endpoint joining the conference at the lowest rate. A Quality Drop Coefficient (QDC) for each endpoint that joins the conference is determined for each selected set, wherein the QDC is computed according to the endpoint entry rate and the highest rate, among the output rates of each selected set, that is lower or equal to said endpoints' entry rate. A Quality Drop Value (QDV) is calculated for each of the selected sets, wherein, preferably, the set of output rates with the lowest QDV is determined as the optimal video rate set to select. The video rate of all the endpoints having a video rate above the highest optimal video rate is reduced to the highest optimal video rate, if required, and the video rate of other endpoints having video rate between two consecutive levels of optimal video rates is reduced to the lowest level among said levels. Whenever a change occurs in either the amount of participating endpoints in the conference or in the declared bit rate capability of the participating endpoints, the video rates of all the outputs are recalculated.

20 Claims, 2 Drawing Sheets

(56) References Cited

U.S. PATENT DOCUMENTS

| | | | |
|---|---|---|---|
| 5,898,668 A * | 4/1999 | Shaffer | 370/230 |
| 6,453,336 B1 * | 9/2002 | Beyda et al. | 709/204 |
| 6,611,503 B1 * | 8/2003 | Fitzgerald et al. | 370/260 |
| 6,711,212 B1 * | 3/2004 | Lin | 375/240.24 |
| 7,006,616 B1 * | 2/2006 | Christofferson et al. | 379/202.01 |
| 2002/0015423 A1 * | 2/2002 | Rakib et al. | 370/485 |
| 2002/0033416 A1 * | 3/2002 | Gerszberg et al. | 235/380 |
| 2003/0185369 A1 * | 10/2003 | Oliver et al. | 379/202.01 |
| 2004/0228291 A1 * | 11/2004 | Huslak et al. | 370/260 |
| 2004/0257433 A1 * | 12/2004 | Lia et al. | 348/14.09 |
| 2006/0023644 A1 * | 2/2006 | Jang et al. | 370/261 |
| 2006/0152575 A1 * | 7/2006 | Amiel et al. | 348/14.01 |

* cited by examiner

METHOD FOR DYNAMICALLY OPTIMIZING BANDWIDTH ALLOCATION IN VARIABLE BITRATE (MULTI-RATE) CONFERENCES

CROSS REFERENCE TO RELATED APPLICATIONS

This application is a continuation of U.S. patent application Ser. No. 10/949,922, filed 24 Sep. 2004, entitled "Method for Dynamically Optimizing Bandwith Allocation in Variable Bitrate (Multi-Rate) Conferences" which claims priority from Israeli Application 158276, filed on 2 Oct. 2003 and also entitled entitled "Method for Dynamically Optimizing Bandwith Allocation in Variable Bitrate (Multi-Rate) Conferences", which are both hereby incorporated by reference.

FIELD OF THE INVENTION

The present invention relates to the field of videoconference. More particularly, the invention relates to a method for determining and assigning the optimal media rates to use for endpoints participating in a multipoint conference

BACKGROUND OF THE INVENTION

Videoconferencing has a wide range of applications, such as desktop and room-based conferencing, video and audio over the Internet and over telephone lines, surveillance and monitoring, telemedicine (medical consultation and diagnosis at a distance), computer-based training and education, and the like. In each application the video information is transmitted over a variety of telecommunication links, such as IP networks, analog telephone lines, ISDN lines etc. Practical communication channels have a limit to the number of bits that they can transmit per second. Sometimes an endpoint is limited to a predetermined bandwidth which is less than the bandwidth capability of its channel. In many cases the bit rate is fixed, i.e., is a Constant Bit Rate (CBR), for example POTS, ISDN and the like. As a result different endpoints participating in a conference can accommodate different bandwidths (i.e., call rate), some endpoints may have a relatively high bandwidth, some have a lower bandwidth and others connect at an intermediate bandwidth.

The term "communication channel", as used herein, refers to the physical media and devices which provide the means for transmitting information from one endpoint to other endpoints, an endpoint being the terminus of a communication path between a transmitter and a receiver. With a communication channel, the "transmitter" is the entity that writes to the endpoint, and the "receiver" is the entity that reads from the endpoint.

Today it is possible to carry out conferences between several endpoints at the same time using suitable conference means, such as those that comprise a Multipoint Conferencing Unit (MCU). An MCU is a multi-port device that allows intercommunication of three or more audiographic, audiovisual or multimedia terminals in a conference configuration, such as RADVISION viaIP. MCUs of RADVISION, Ltd. Typical MCUs include a Multipoint Controller and a Multipoint Processor; the Multipoint Controller is used for administering the conference (e.g., by making required decisions regarding the endpoint participating in the conference); the Multipoint Processor is used for processing the content of the conference (such as voice, video and other relevant data). Usually, the decisions made by the Multipoint Controller are executed by the Multipoint Processor.

The video codec used in such MCU is usually a variable bit-rate codec (e.g. H.263). While using such an MCU, participants connected via endpoints at different bandwidths may be allowed to join the same conference at different call rates.

In the prior art, several attempts were made in order to enable endpoints running video at different bit-rates to join one and the same conference and maintain their own speed and associated video quality. For example, bit-rate matching of different endpoints allows 112 or 128 Kbps systems to join 336 or 384 Kbps systems in a single conference. However, bit-rate matching in conferences between endpoints with different bit-rates results in all endpoints dropping down to the same rate as the endpoint running the lowest bit-rate, unless video processing resources (a resource capable among other functions of transcoding video from one higher rate to another lower rate) are available. However, when this type of resource is available, the bit rates allowed in the conference are, in the prior art, manually predetermined and not necessarily optimized for optimum quality. In current implementations the administrator/operator chooses a set of bandwidths to be used during the conference, and each endpoint joining is generally automatically assigned a bandwidth for the duration of the conference. For example, a call with three 384 Kbps-capable video systems and one 128 Kbps system would result, according to the prior art in all systems operating at 128 Kbps, when no video processing resource is available. If such resource is available and the operator determined the allowed rates to be 384 kbps and 128 kbps then each endpoint would be receiving optimum quality video. However, if the 128 kbps endpoint decided to join at 256 kbps without the knowledge of the conference administrator he would still get 128 kbps video which obviously isn't optimal.

Other bit-rate matching methods involve splitting the endpoints into predetermined groups according to specific bandwidth resources. However, the video bit-rate used by such predetermined group is fixed and, as a result, the overall quality experienced by the participants in the conference is not optimal.

It is an object of the invention to provide a method for administering output rates in a multipoint conference environment, which overcomes the aforementioned drawbacks of the prior art.

It is another object of the present invention to provide a method which will allow the selection of a set of output rates in such a manner that the resources utilized provide the best possible video quality to the whole of the conference participants at any given time.

Other objects and advantages of the invention will become apparent as the description proceeds.

SUMMARY OF THE INVENTION

The present invention relates to a method for dynamically allocating bandwidth in a multi-rate video conference, which comprises:

a) providing conference means having two or more outputs, each of which is capable of outputting data at different rates, thereby supporting two or more endpoints which may have different video rates;

b) connecting two or more endpoints to said conference means for participating in said conference;

c) whenever more than one video rate is used by participants in said conference:

i) selecting each set of output rates from all possible combination of output rates in said conference means, wherein the lowest output rate in each selected set is the entry rate of the endpoint joining said conference at the lowest rate;

ii) for each selected set, determining a Quality Drop Coefficient (QDC) for each endpoint that joins said conference, wherein said QDC being computed according to the endpoint entry rate and to the highest rate, among the output rates of each selected set, that is lower or equal to said endpoints' entry rate;

iii) calculating a Quality Drop Value (QDV) for each of said selected sets, wherein, preferably, the set of output rates having the lowest QDV is determined as the optimal video rate set to select;

d) reducing the video rate of all the endpoints having a video rate above the highest optimal video rate to said highest optimal video rate, if required, and reducing the video rate of other endpoints having video rate between two consecutive levels of optimal video rates to the lowest level among said levels; and e) whenever a change occurs in either the amount of participating endpoints in the conference or in the declared bitrate capability of the participating endpoints, recalculating the video rates of all the outputs.

According to a preferred embodiment of the present invention, the QDV is calculated starting from the second highest video rate and reduced consecutively to each of the next lower video rates, until a predetermined video rate above the lowest video rate of the endpoints participating in the conference is reached.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

Figure 1:
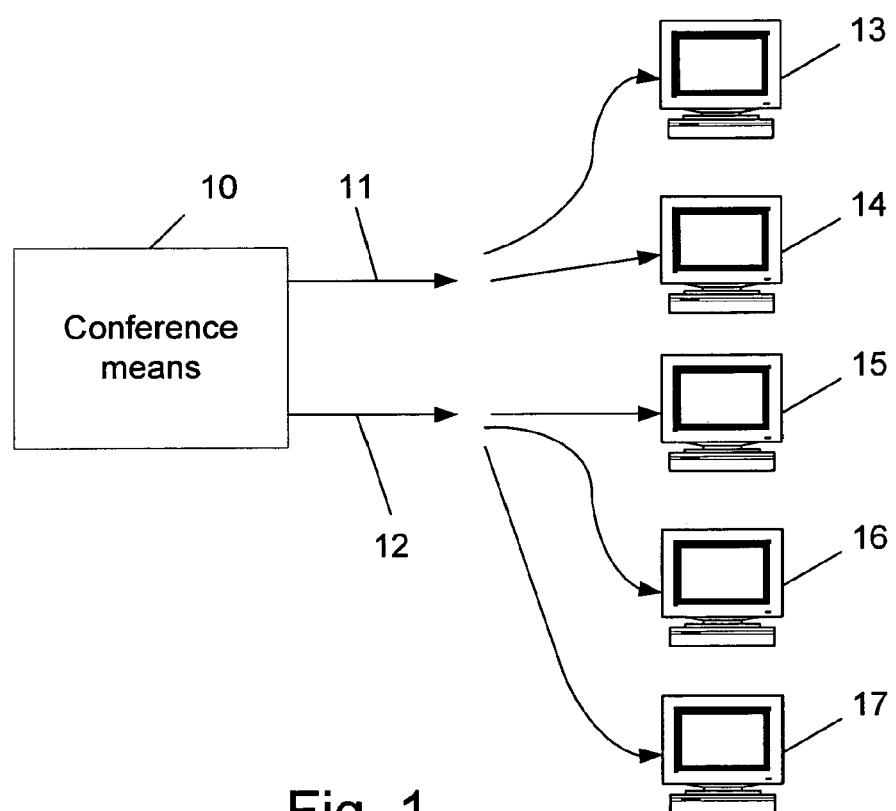
FIG. 1 schematically illustrates a typical multi-rate conference arrangement.

The invention will now be described primarily with reference to examples of a video conference between two or more endpoints. These examples are provided merely to illustrate the invention and are not intended to limit its scope in any way. It should be understood that the invention can be applied mutatis mutandis to other methods in which different bandwidths are available to different joint users, such as streaming video over the Internet.

As stated, the invention relates to a method for dynamically selecting the optimal rates to use in a conference with three or more endpoints, wherein each endpoint may have a different video rate. The conference has the ability to provide media to the endpoints joining it, for at least two rates (i.e., multi-rate conference). In order to carry out such a conference it is required to provide suitable equipment or conference means, such as a server which includes a capability for transcoding media from one rate to at least one other. For example, such conference means can be the viaIP product line (viaIP-MCU30/60/100) of RADVISION, Ltd., the Accord MGC product line (MGC25/50/100) of Polycom, Inc., the MCU8/16 of TANDBERG and the like.

In order to establish a conference, two or more endpoints need to be connected to the conference means. According to a preferred embodiment of the present invention whenever more than one video rate is available in the conference (i.e., at least two endpoints which participate in the conference have distinct video rates), the processing unit of the conference means, such as the one in a standard embodiment of an MCU, (e.g., the Multipoint Controller of the viaIP-MCU100 of RADVISION, Ltd. or of any other suitable means), calculates a Quality Drop Coefficient (QDC) for each endpoint joining the conference, and then calculates a Quality Drop Value (QDV) for each potential set of output rates of the conference means. Preferably, but not limitatively, the QDC is computed according to the second highest video rate between the endpoints (if two endpoints have the same highest video rate then this video rate is considered the second highest) participating in the conference, and the QDV is a function of each calculated QDC and the number of endpoints suffering from each calculated QDC. These calculations determine the optimal video rate that will be provided at each output of the conference means.

According to a preferred embodiment of the invention, the decisions about the rate at which each output of the conference will operate, together with the other calculations discussed hereinabove, determine which output will be assigned to each endpoint participating in the conference. After selecting the optimal rates to be used in the conference, the server will use standard mechanisms to guide the endpoints to the output they were assigned to. For example, this can be achieved by a combination of methods:

Commanding the Multipoint Processor to send a specific output stream to a certain endpoint rather than another output stream of the Multipoint Processor (e.g., through the Media Gateway Control protocol).

Commanding the endpoint sending the video to limit its output by use of commands supported by a signaling protocol (e.g. the flow control command that exists in the H.245 ITU standard or a similar command in the SIP protocol).

As a result, the conference means may reduce the video rate (i.e., limiting the bandwidth) of all endpoints capable of performing a conference with video rates above the highest optimal video rate to this highest selected media output rate. Thereby, a dynamic allocation of bandwidth in a multi-rate conference is obtained for each endpoint or group of endpoints.

According to a preferred embodiment of the present invention, the QDV is calculated starting from the second highest video rate and reduced consecutively to each of the next lower video rates, until a predetermined video rate above the lowest video rate of the endpoints participating in the conference is reached.

FIG. 1 schematically illustrates an example of a typical multi-rate conference means (10). Conference means 10 has two outputs 11 and 12 (limited to two in the figure for the sake of simplicity), each of which can provide a distinct video bit-rate. In this figure, five different endpoints (13-17) participate in a conference, endpoints 13 and 14 being dynamically connected to output 11 and endpoints 15-17 being dynamically connected to output 12. During the conference, when an endpoint joins or leaves the conference, the QDV for the new setting is recalculated. The new calculation may lead to a decision about a change in one or more output rates causing some of the endpoints, in some cases, to be assigned to a new output according to the updated calculation of the optimal QDV for the conference.

In such a case three parameters play a role in the decision mechanism that will provide the best possible service quality to each participant in the conference, corresponding to the maximum bandwidth resources of each participant's endpoint equipment:

Maximum conference rate—which is the rate defined by the service template used by the conference;

Minimum conference rate—which is the minimum rate allowed for video by the

Adjustment conference rate—which is the rate that is allowed by the MCU to join a certain conference even though the video rate does not match exactly the conference's video rate, e.g., audio codec bandwidth differences and the like.

In the prior art, the highest common denominator of the video bandwidth of the endpoints participating in a conference is the bandwidth of the video, provided that this denominator is higher than the minimum conference rate. If a specific endpoint does not comply with the minimum conference rate (i.e., the lower limit to join a conference), then such endpoint is not taken into account for the video rate determination of the conference. For example, if two endpoints having a video rate of 640 kbps join a conference that has a service template allowing for video rates of up to 768 kbps, then, if another endpoint joins this conference with a video rate of 384 kbps (which is above the minimum defined conference rate) the conference will be "downgraded" to 384 kbps. When this third endpoint leaves the conference, assuming the two other endpoints are still there, the video bit-rate will "jump" back to 640 kbps.

In case of conferences with video processing resources— said resources are allocated for a conference. In such a case the high rate of the endpoint behaves in the same way as described hereinabove, with reference to the case of conferences without video processing resources, and the low rate of this conference behaves in a similar way as its highest rate with respect to all the endpoints not serviced by the high rate.

When the minimum allowed output rate of the high output of the conference is lower than the maximum output rate of the next output (i.e. when there is an overlap in the rate ranges), the situation is more complex. This however, is the common configuration allowing optimal use of the resources available to a conference. When an endpoint joins the conference at a rate that belongs to both ranges, the conference means has to decide to at which range it will allow it to join by utilizing the method of the present invention. The following are examples of such decisions, according to a preferred embodiment of the present invention:

For example, a conference is running with a configuration including the following video bandwidth parameters:

Maximum bit-rate—768 kbps

Minimum high rate—350 kbps [0043] Maximum rate matched (low) bitrate—400 kbps

Minimum rate matched (low) bitrate—128 kbps

In one case, eight endpoints are connected to the conference at a bit-rate of 768 kbps each. A ninth endpoint joins the conference at a bit-rate of 384 kbps. In this case it is logical that the endpoints involved in the conference will remain at 768 kbps while the new endpoint will receive a "transrated" video signal at 384 kbps. If now an endpoint joins at 128 kbps, a question arises of what to do with the other participants. According to this example, two alternatives are possible (and valid according to the configuration of the conference means):

The first alternative: the transrated video will now run at 128 kbps and the endpoint with the bit-rate of 384 kbps will receive a 128 kbps video quality; and The second alternative: all the endpoints running video at a bit-rate of 384 kbps or higher will be flow controlled to run video at a bit rate of 384 kbps (i.e. the 768 kbps participants will send and receive video at a bit-rate of 384 kbps—lower bandwidth).

However, in another case, five endpoints join a conference with a video bit-rate of 256 kbps, and a sixth one joins the conference with a video bit-rate of 128 kbps. In this case the conference will run at 128 kbps. A transrating resource channel will be used, wherein a transrating channel is a resource capable of modifying a media channel from one bitrate to another, lower, bitrate. For example, in the case of video it is a resource capable of receiving video at a relatively high bitrate (e.g., 768 kbps), and providing a video channel at a lower bitrate (e.g., 384 kbps) with a similar content but of lesser quality.

Figure 2:
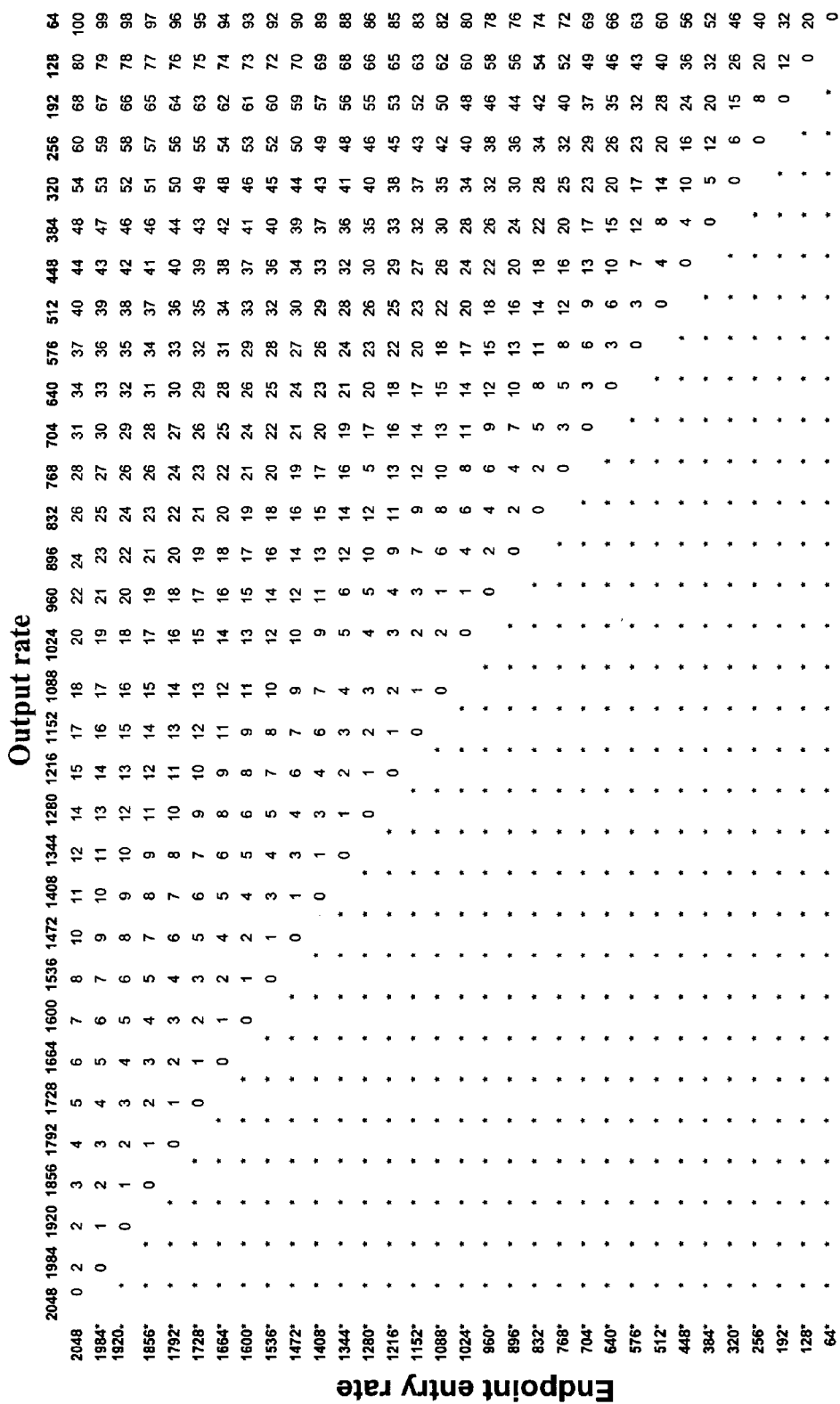
FIG. 2 is a table of quality degradation coefficients.

In order to decide on which rates to output from the conference means, to the participating endpoints in a conference, as mentioned above, a weighted approach (i.e., the calculation of the QDC and QDV) is used according to the method of the present invention. In order to assess the impact of each decision on the video quality applied to each additional endpoint joining the conference, QDC and QDV are dynamically recalculated during the conference. As described above, the weight (i.e., QDC and QDV) is a combination of the "quality degradation" and the number of users suffering this "quality degradation". FIG. 2 is an illustrative example of a table of quality degradation coefficients. Preferably, but not limitatively, the QDV is computed according to a bi-dimensional table holding the "quality drop coefficients". Preferably, for each endpoint entry bit-rate, a coefficient will be defined, depending on the bit-rate to which it will actually be connected. Looking now at the table of FIG. 2, the leftmost column of the table defines the entry rate of the endpoint to the conference, and the uppermost row of the table defines the selected output rate. The intersection between the endpoint entry bitrate value and the selected output bitrate value is the QDC for that endpoint. For example, if the entry bitrate of an endpoint is 1024 Kb/sec and it joins a conference with selected output bitrate of 512 Kb/sec, then the QDC of the first endpoint will be 20. Logically, the higher the difference between the selected output rate and the endpoint's entry rate the larger the quality degradation of the stream for this endpoint (i.e., a higher quality drop coefficient reflects a relatively high quality degradation, and vice versa). Therefore, in this example the QDC values in the table increase from left to right and decrease from top to bottom. Naturally, the suggested set of coefficient values in the table show one example for such a set. Other sets of coefficient values can also be used, preferably while maintaining the same logical principal as described hereinabove.

When an endpoint joins a multi-rate conference, it passes through a module responsible for the assignment of new endpoints to conferences. This module decides to which output of the conference to connect the endpoint. For example when an endpoint joins a conference configured to support a maximum video bitrate of 384 kbps and a minimum bitrate of 256 kbps at a rate of 128 kbps, this module will decide that the endpoint can send video to the conference participants but cannot receive video since it does not comply with the minimum requirement of the conference. Usually, such a module has a set of rules that determine to which output to assign the endpoint. It should be noted that along with the assignment of an output of the conference means to an endpoint, one or more of the existing participants of this output might be moved over to other outputs of the conference, depending on the new calculation of the QDV.

According to a preferred embodiment of the invention, lowering the bandwidth is not the only parameter that may be affected by an endpoint joining a conference. In some cases, if the service is configured accordingly, if the new endpoint supports a lower resolution than the resolution currently active in the conference, degradation in resolution is also allowed (i.e., resolution mechanism). Conferences with Common Intermediate Format (CIF) resolution or higher may drop down to a CIF resolution but not lower, i.e. if an endpoint supporting only Quarter Common Intermediate Format (QCIF) joins a conference running with a resolution of CIF or higher, it will not see video (even if it is the first participant).

Unlike in the case of the bandwidth allocation, as described hereinabove, where the higher bit-rate is restored after the endpoint "forcing" a lower bit-rate leaves the conference, the resolution mechanism does not restore the initial resolution after the endpoint that caused the conference video resolution to drop leaves the conference.

Pseudo Code

The following example is a pseudo code describing the steps required to implement the method of the present invention:

Endpoint joins at rate R1.
If R1>Maximum conference rate THEN save Max conference rate to rate table as endpoint's bitrate.
If R1<Minimum conference rate THEN no video.
Save R1 to rate table.
For each output, if capabilities match and if output rate (RO)>=rate R1>=(RO-adjustment) THEN endpoint joins this output, adjust if needed, GOTO end.
If no valid output was found THEN if R1 is lower than lowest output rate THEN lowest output rate is lowered to R1.
If more than one rate is available THEN:
For each 64 kbps rate starting from the second highest (endpoint) rate and going down in 64 kbps steps till 128 kbps above the lowest rate, compute the QDV. Note that there is value to compute only for the rates at which at least one of the participating endpoints entered the conference.
QDV=QDC1 (Quality Drop Coefficient 1)*number of endpoints suffering QDC1+QDC2*number of endpoints suffering QDC2+ . . . +QDCn*number of endpoints suffering QDCn.
The quality drop coefficient is computed according to the highest rate of a set of endpoints, i.e. if an endpoint joins a 384 kbps conference at 1.5 Mbps and it is the only one at this rate, its QDC will be computed as if it joined at 384 kbps (since there is no value to having it run at 1.5 Mbps).
The output rate with the lowest QDV is the optimal rate.
Flow control all endpoints with higher bitrate to this optimal rate. Flow control all other endpoints to the lower rate.
When more than two output rates are available, the For loop becomes nested.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

What is claimed:

1. A method of allocating conference resources on a conference system, said method comprising:
   dynamically calculating for multiple participants of a given conference, by a controller of said system, a quality drop coefficient (QDC) for possible resource allocations of said system for said given conference, wherein said QDC for a given participant for a given resource allocation represents a quality of service said participant would experience in said given conference if said given resource allocation is implemented in said given conference and, wherein said QDC is calculated by said controller separately for each participant in said conference and is computed according to a second highest video rate between said multiple participants;
   dynamically calculating, by said controller, for said possible resource allocations a quality drop value (QDV), which QDV for a given resource allocation represents a weighted aggregation of said calculated QDC's for said given resource allocation;
   dynamically selecting, by said controller from said possible resource allocations said resource allocation with said lowest calculated QDV; and
   implementing, by said system, said selected resource allocation, by, via said controller, one of sending said selected resource allocation for each participant to said each participant and commanding said participant associated with said selected resource allocation to limit the output of said associated participant.

2. The method according to claim 1, wherein said QDV calculation includes consideration of a conferencing resource allocation priority.

3. The method according to claim 2, wherein said resource allocation priority is to minimize image quality degradation for one or more of said multiple participants.

4. The method according to claim 1, wherein said calculated QDC for each resource allocation is represented in a table.

5. The method according to claim 2, wherein said resource allocation priority is to maximize service fees from participants.

6. The method according to claim 5, wherein maximizing service fees comprises compliance with at least one Service Level Agreement requirement.

7. The method according to claim 1, further comprising performing said steps of said method of claim 1 again upon a participant leaving said conference, wherein said process of performing the steps again comprises accounting for a maximum conference rate, a minimum conference rate, and an adjustment conference rate.

8. The method according to claim 1, further comprising performing said steps of said method of claim 1 again upon a new participant entering said conference, wherein said process of performing the steps again comprises accounting for a maximum conference rate, a minimum conference rate, and an adjustment conference rate.

9. The method according to claim 1, further comprising performing said steps of said method of claim 1 again upon a capability of a conference participant changing.

10. A multi-participant conferencing system comprising:
   conferencing resources; and
   a control unit for:
   (1) dynamically calculating for multiple participants of a given conference a quality drop coefficient (QDC) for possible resource allocations of said conferencing resources for said given conference, wherein said QDC for a given participant for a given resource allocation represents a quality of service said participant would experience in said given conference if said given resource allocation is implemented in said given conference and wherein said QDC is calculated by said control unit separately for each participant in said conference and is computed according to a second highest video rate between said multiple participants;

(2) dynamically calculating for said possible resource allocations a quality drop value (QDV), which QDV for a given resource allocation represents a weighted aggregation of said calculated QDC's for said given resource allocation;

(3) dynamically selecting from said possible resource allocations said resource allocation with said lowest calculated QDV; and (4) providing to said participants said conferencing resources according to said selected resource allocation by one of sending said selected resource allocation for each participant to said each participant, and commanding said participant associated with said selected resource allocation to limit the output of said associated participant.

11. The system according to claim 10, wherein said QDV calculation includes consideration of a conferencing resource allocation priority.

12. The system according to claim 11, wherein said resource allocation priority is to minimize image quality degradation for one or more of said multiple participants.

13. The system according to claim 10, wherein said calculated QDC for each resource allocation is represented in a table functionally associated with said control unit.

14. The system according to claim 11, wherein said resource allocation priority is to maximize service fees from participants.

15. The system according to claim 14, wherein maximizing service fees comprises compliance with at least one Service Level Agreement requirement.

16. The system according to claim 10, wherein upon a participant leaving a conference, said control unit recalculates said QDV for each possible resource allocation and accordingly reselects said resource allocation with said lowest calculated QDV, wherein said recalculating comprises accounting for a maximum conference rate, a minimum conference rate, and an adjustment conference rate.

17. The system according to claim 10, wherein upon a participant entering a conference, said control unit recalculates said QDV for each possible resource allocation and accordingly reselects said resource allocation with said lowest calculated QDV, wherein said recalculating comprises accounting for a maximum conference rate, a minimum conference rate, and an adjustment conference rate.

18. The system according to claim 10, wherein upon a capability of a conference participant changing, said control unit recalculates said QDV for each possible resource allocation and accordingly reselects said resource allocation with said lowest calculated QDV.

19. A machine-readable non-transitory storage medium comprising instructions which, when executed, cause a conference system to:

upon a participant entering or leaving a given conference:
(1) dynamically calculate for multiple participants of said given conference a quality drop coefficient (QDC) for possible resource allocations of said system for said given conference, wherein said QDC for a given participant for a given resource allocation represents a quality of service said participant would experience in said given conference if said given resource allocation is implemented in said given conference and wherein said QDC is calculated by said system separately for each participant in said conference and is computed according to a second highest video rate between said multiple participants;

(2) dynamically calculate for said possible resource allocations a quality drop value (QDV), which QDV for a given resource allocation represents a weighted aggregation of said calculated QDC's for said given resource allocation;

(3) dynamically select from said possible resource allocations said resource allocation with said lowest calculated QDV; and (4) implement said selected resource allocation by one of to send said selected resource allocation for each participant to said each participant, and to command said participant associated with said selected resource allocation to limit the output of said associated participant.

20. The machine-readable storage medium according to claim 19, wherein said QDV calculation includes consideration of a conferencing resource allocation priority.

* * * * *